G. MAGNASCO.
METHOD AND MACHINE FOR THE MANUFACTURE OF REINFORCED SHEET MATERIAL.
APPLICATION FILED SEPT. 19, 1916.
1,316,845.
Patented Sept. 23, 1919.
2 SHEETS—SHEET 1.
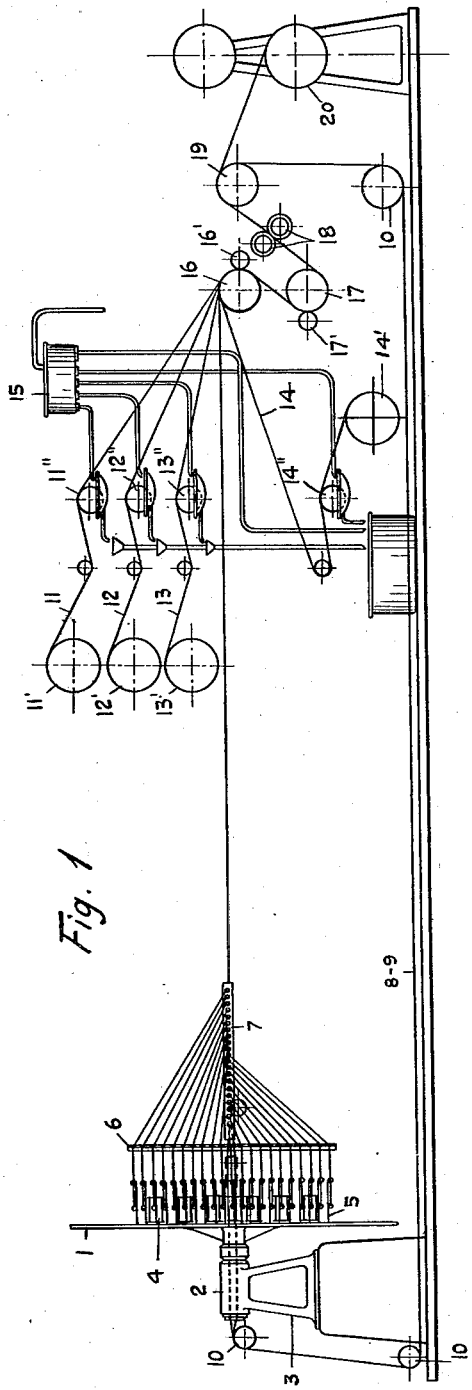
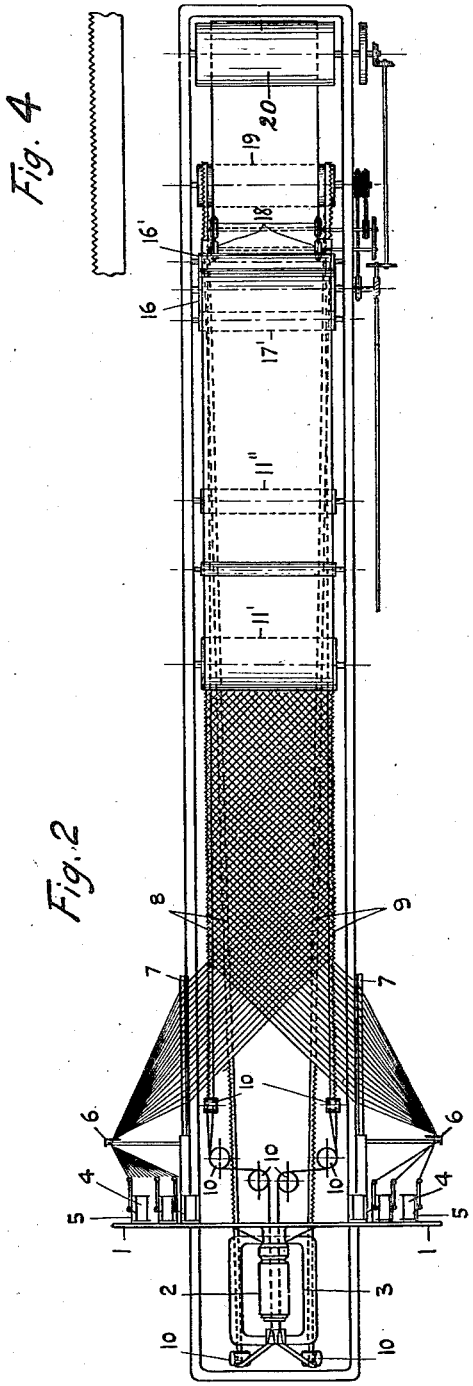
G. Magnasco.
Inventor
By G Croydon Marks
atty.

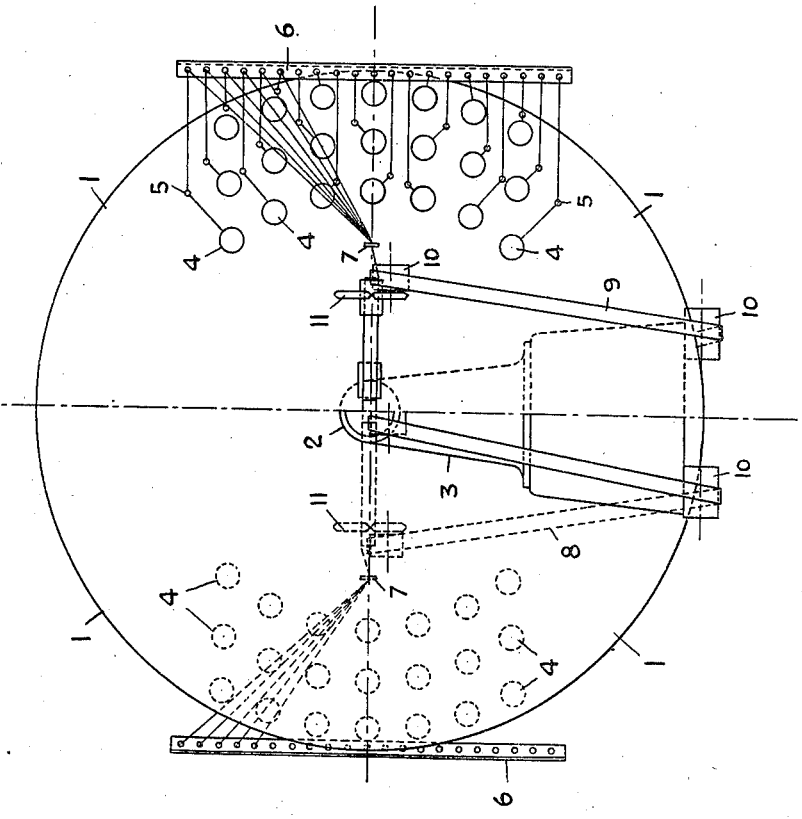

UNITED STATES PATENT OFFICE.

GIOVANNI MAGNASCO, OF GENOA, ITALY.

METHOD AND MACHINE FOR THE MANUFACTURE OF REINFORCED SHEET MATERIAL.

1,316,845.      Specification of Letters Patent.      Patented Sept. 23, 1919.

Application filed September 19, 1916. Serial No. 121,097.

*To all whom it may concern:*

Be it known that I, GIOVANNI MAGNASCO, a subject of the King of Italy, and residing at Via Sturla 17, Genoa, Italy, have invented new and useful Improvements in Methods and Machines for the Manufacture of Reinforced Sheet Material, of which the following is a specification.

This invention consists in a method and machine for the manufacture of a continuous strip of fabric and particularly for forming a continuous strip of reinforced sheet material such as paper or the like in which the reinforcing fabric is formed of two superposed sets of parallel threads, the threads of each set being inclined at an angle of 45 degrees to the axis of the strip and the threads of one set crossing the threads of the other set. By this disposition of the threads a sheet material is obtained which is reinforced throughout by a fabric consisting of equilateral rectangles whereby the structure is adapted to sustain equal strains no matter in which direction the sheet is subjected to these strains.

In the drawings there is illustrated by way of example a machine by which the method (according to the present invention) is put in practice.

In these drawings Figure 1 is a side elevation of the machine and Fig. 2 a plan of the same.

Fig. 3 is an end view of the machine with one half seen from one side and with the other half seen from the opposite side.

Fig. 4 is a detail of the metallic toothed ribbon.

1 is a turning disk rotatably supported in a bearing 2 of the framing 3 and put in motion by any convenient driving means not illustrated. Upon the disk are arranged two sets of spools 4 from which unwind threads guided by means of eyes provided in the rods 5 and passing through holes in two cross rods 6 and afterward through holes in two longitudinal rods 7. The rods 5 as well as the cross rods 6 and longitudinal rods 7 are rigidly fastened on the turning disk 1. The rods 7 are arranged opposite each other with respect to the axis of the disk and at equal distances therefrom.

Inside the field described by the guide rods 7 there are arranged two flexible steel ribbons 8 and 9 situated symmetrically one on each side of the axis of the machine and put in motion by any known driving means not illustrated. These ribbons are guided by a convenient number of pulleys 10 and are provided on their outer edges with small teeth adapted to receive the threads and prevent them from slipping in forming the material.

In manufacturing for instance a material of 3 feet width the two endless ribbons 8 and 9 will be adjusted to a distance of 3 feet apart and the ribbons put in motion with such a speed that in making a linear movement of 3 feet the turning disk will make half a revolution.

The rotating parts of the threads of each set of spools in a certain rotating position of the disk only engage around the edge of one ribbon and then extend across the top of the other ribbon in the one case and across the bottom of the ribbon in the other case and with opposite inclinations with respect to the axis of the material. By the continuation of the motion both sets of the threads will engage around the edges of the ribbons previously crossed thereby and so on in the manner of a spiral. In order to explain the expression "opposite inclination" it is pointed out that the threads passing around the ribbon 8 (see Fig. 2.) are inclined at 45 degrees to the axis of the material in one direction while the threads passing around the ribbon 9 are inclined at 45 degrees to said axis in the opposite direction.

In this manner all the threads of one guide rod 7 will cross all the threads of the other guide rod 7 at a right angle and form together a fabric constituted throughout of meshes of equilateral rectangles.

In continuing the motion of the ribbons 8 and 9 and the rotation of the guide rods 7, 7 so that a linear movement of 3 feet of the ribbons will correspond with a half revolution of the rods 7, 7 a continuous fabric strip will be obtained.

Four webs of sheet material such as paper or the like are indicated at 11, 12, 13 and 14 and passing through the machine into the path of the fabric in motion and unwinding from supply reels 11', 12', 13' and 14'. These webs are conducted over rolls 11'', 12'', 13'' and 14'' which by pipings from a common tank 15 are supplied with a convenient adhesive which is communicated to the different webs running over the different rolls. The webs of sheet material and the fabric are now conducted over the rolls 16 and 17 against each of which, by means of a counterweight or other device, are pressed counter rolls 16' and 17' respectively which press the layers together. 18 are circular knives arranged in such a manner as to cut the reinforced sheet material to the desired width and in order to liberate the fabric from the metal ribbons 8 and 9. Beyond these circular knives the reinforced sheet material is conducted over a guide roll 19 and from here on the roll 20 in finished condition.

Besides its employment for the reinforcement of paper sheets the fabric consisting of the two sets of superposed crossing threads may also have other practical applications. The fabric formerly supplied with a special pasty glue may be passed across a system of rolls and strongly compressed or the fabric may be lined by strips of paper or lined by any other convenient material so that the threads of the fabric will be kept in their position.

Having now described my invention what I desire to secure by Letters Patent is:—

1. A machine for forming a continuous sheet of fabric comprising a rotating member, two sets of thread spools arranged on said member one set on each side of the center thereof, a straight guide having a series of alined spaced apertures arranged at opposite sides of the center of the rotating member, said guides being parallel to each other and extending at right angles to the rotating member for guiding each set of threads and maintaining the threads of each set in spaced relation, a pair of parallel strips located in a plane which is at right angles to said rotating member, and which passes through the center thereof, said strips being centrally arranged with respect to the rotating member and spaced apart a distance equal to the width of fabric required, and means for causing relative longitudinal motion between said strips and the rotating member while the latter rotates so as to wrap the threads in a spiral fashion around said strips, the motions being so related that the threads of the two sets always cross one another at right angles.

2. A machine for forming a continuous sheet of fabric comprising a rotating member, two sets of thread spools arranged on said member one set on each side of the center thereof, a straight guide having a series of alined spaced apertures arranged at opposite sides of the center of the rotating member, said guides being parallel to each other and extending at right angles to the rotating member for guiding each set of threads and maintaining the threads of each set in spaced relation, a pair of endless ribbons one section of each being parallel and located in a plane which is at right angles to said rotating member and which passes through the center thereof, said parallel sections being centrally arranged with respect to the rotating member and spaced apart a distance equal to the width of fabric required, and means for moving said parallel sections of the ribbons longitudinally while the rotating member rotates so as to wrap the threads in a spiral fashion around said sections, the motions being so related that the threads of the two sets always cross one another at right angles.

3. A machine for forming a continuous sheet of fabric comprising a rotating member, two sets of thread spools arranged on said member one set on each side of the center thereof, a straight guide having a series of alined spaced apertures arranged at opposite sides of the center of the rotating member, said guides being parallel to each other and extending at right angles to the rotating member for guiding each set of threads and maintaining the threads of each set in spaced relation, a pair of parallel strips located in a plane which is at right angles to said rotating member and which passes through the center thereof, said strips being centrally arranged with respect to the rotating member and spaced apart a distance equal to the width of fabric required, means for causing relative longitudinal motion between said strips and the rotating member while the latter rotates so as to wrap the threads in a spiral fashion around said strips, the motion being so related that the threads of the two sets always cross one another at right angles, reels on which webs of sheet material are mounted, means for feeding such webs into contact with the fabric, and means for applying adhesive to said webs to cause the same to adhere to the threads.

4. A machine for forming a continuous sheet of fabric comprising a rotating member, two sets of thread spools arranged on said member one set on each side of the center thereof. straight guides arranged parallel to said rotating member, located on opposite sides of the center of the rotating member and each having a series of alined apertures through which the threads are passed, a straight guide having a series of alined spaced apertures arranged on opposite sides of the center of the rotating member, the last named guides extending at right angles to the first guides for guiding each set of threads and maintaining the threads of each set in the same plane, a pair of parallel strips located in a plane which is at right angles to said rotating member and which passes through the center thereof, said strips being centrally arranged with respect to the rotating member and spaced apart a distance equal to the width of fabric required, means for causing relative longitudinal motion between said strips and the rotating member while the latter rotates so as to wrap the threads in a spiral fashion around said strips, the motion being so related that the threads of the two sets always cross one another at right angles, and means for cutting the fabric along the edges.

In testimony whereof I have signed my name to this specification in the presence of two subscribing witnesses.

GIOVANNI MAGNASCO.

Witnesses:
    ADOLFO WEBER,
    MANCIULLI PIETRO.